Feb. 23, 1965   M. J. COLLINS   3,170,240
VARIABLE DRIVE LINEAR MEASURING INSTRUMENT FOR ESTIMATING
MATERIAL QUANTITIES AND THE LIKE
Filed April 29, 1963   2 Sheets-Sheet 1

INVENTOR:
MATTHEW J. COLLINS
BY
ATTORNEY.

Feb. 23, 1965  M. J. COLLINS  3,170,240
VARIABLE DRIVE LINEAR MEASURING INSTRUMENT FOR ESTIMATING
MATERIAL QUANTITIES AND THE LIKE
Filed April 29, 1963  2 Sheets-Sheet 2

INVENTOR
MATTHEW J. COLLINS
BY
ATTORNEY.

United States Patent Office 3,170,240
Patented Feb. 23, 1965

3,170,240
VARIABLE DRIVE LINEAR MEASURING INSTRUMENT FOR ESTIMATING MATERIAL QUANTITIES AND THE LIKE
Matthew J. Collins, 403 Oakmont Circle, Ballwin, Mo.
Filed Apr. 29, 1963, Ser. No. 276,346
6 Claims. (Cl. 33—140)

This invention relates to linear measuring instruments and particularly to a variable drive measuring instrument for making quantity surveys and the like from drawings of varying scale.

A typical utilization, exemplifying the need for the present instrument, is the work of an estimator on a construction project in checking drawings for a particular material, for example, pipe. Each sheet of the drawings may be laid out to a different scale; furthermore several diameters of pipe or other different materials may be called for. Under present practice, the estimator must: measure each drawing for the amount of pipe, ordinarily using for this purpose a scale which corresponds to the scale of the drawing; mark off from the drawing each length of pipe so scaled; record its length on a separate tallying column for the particular diameter of pipe or other material being measured; and total up each column separately. This is a time-consuming, arduous procedure which produces many errors.

The purposes of the present invention include providing an instrument which automatically registers and totals continuously the length of the material being measured; which measures linearly all "scales" commonly used on construction drawings; which provides a plurality of totalling registers, so that a different register may be used for each material to be estimated; and whose coupling to the register is readily disconnected, for changing scales or registers.

These, and the other objectives of the invention which will be apparent from the specification, are achieved in the present invention by incorporating certain novel features which in combination make it highly advantageous for the present use.

Rotational operated registering counters, employed for other purposes, have heretofore been provided with a rotatable winding reel, having an extensible cord, cable or tape rewindable upon the reel to an initial measuring position. Means, such as a clock spring or other torsional spring have been utilized to exert a guidable torsional restraint against unwinding, and to automatically rewind such reels. In the present invention, such cord or equivalent member is extended by a ring through which the tip of a marking pencil is inserted, drawing the cord off the winding reel from its initial, wound position to such length as is to be measured. Irreversible means are provided at any convenient place in the device which couples the rotation of the reel to the registering elements of the counter, so that rewinding of the cord member will not affect the amount linearly measured.

Generally stated, the present invention consists in providing mechanism in which:

The winding reel has a plurality of axially-adjacent wind-receiving means, each of a different perimeter, scaledly proportioned to each other and corresponding in perimetral scale to typical scales to which construction drawings are made; so that the length of cord unwound on measuring a scaled drawing registers on the rotational-operated counter the true length of material.

Scale change is effected by unwinding the cord completely, and by shifting the winding reel axially relative to the cord end, then reengaging the inner end of the cord on any selected wind-receiving perimeter, by the means provided.

Means to uncouple the register of the counter from the rotation of the winding reel are provided, for use when scale change is made.

An indexable turret including several registering counters is utilized in the preferred embodiment, one for each type of material included in the survey; and the same means to uncouple the counters is used to change counters as to change scale.

Figures 1, 2:
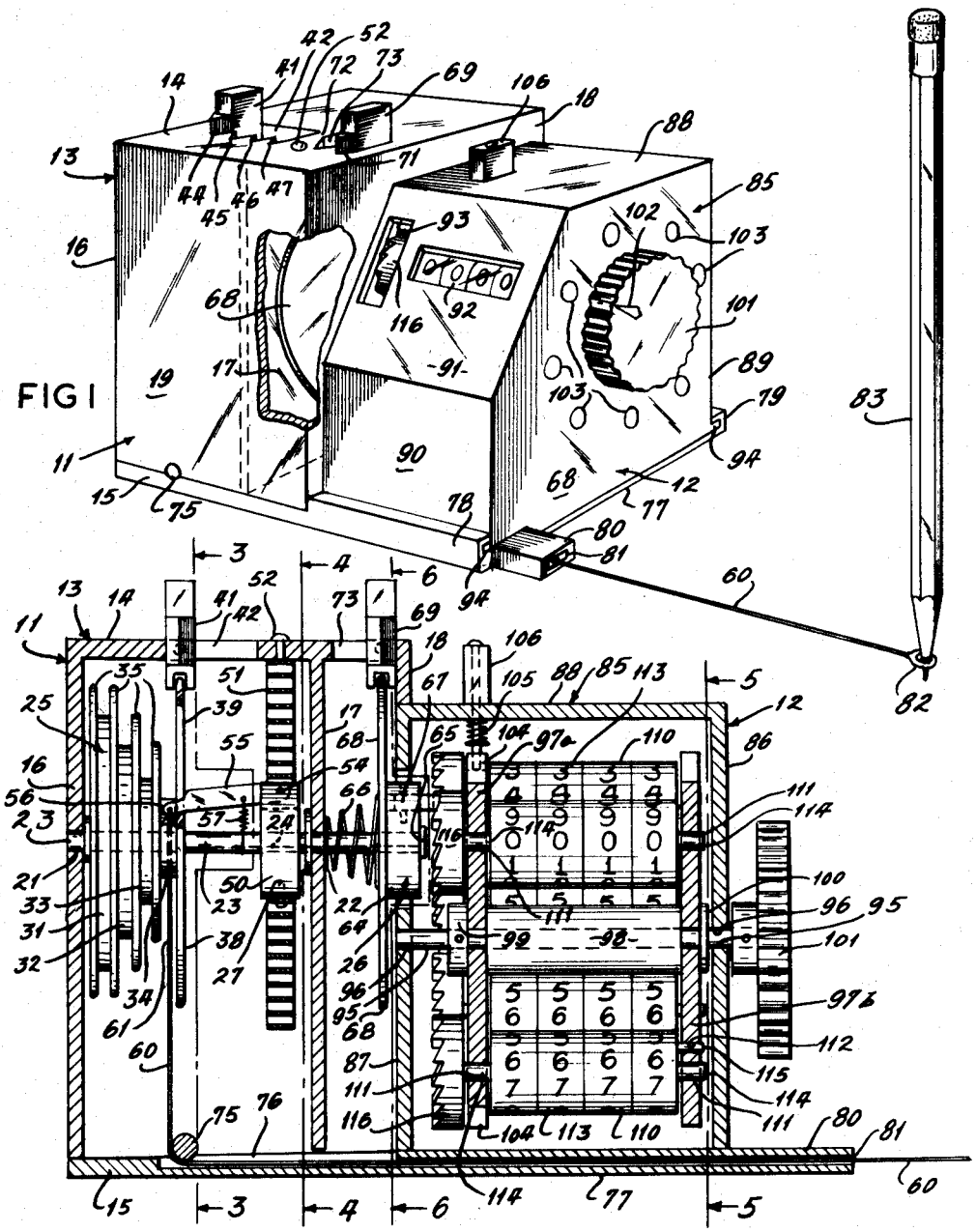
FIGURE 1 is a perspective view of a variable drive linear measuring instrument embodying the present invention.
FIGURE 2 is an interior view, partly elevational, partly in section as seen along the offset line 2—2 of FIGURE 5.

The measuring instrument illustrated consists basically of two assemblies, one which converts linear extension to rotation, shown at the left of FIGURES 1 and 2 and generally designated 11, and one which counts rotations, separately for each material to be tabulated, generally designated 12. Henceforth in this specification these portions are referred to as the converter element 11 and the counter turret 12.

The converter element 11 has a gnerally rectangular case 13, including a top wall 14, a bottom wall 15, a left side wall 16, a recessed wall 17 near its right side, a cut-out right side wall 18, and front and rear walls 19, 20. Extending longitudinally through the case 13, and rotatively mounted in aligned bores 21, 22 through its left wall 16 and its recessed wall 17, is the converter shaft 23, having at its right side a keyway 24. Of the several rotative elements on the shaft 23 the principal ones are: a winding reel generally designated 25, freely turnable and slidable at the left end of the shaft 23; a torsion spring winder assembly generally designated 27, keyed between the winding reel 25 and the recessed wall 17; and a pawl-carrying assembly generally designated 26, keyed for relative axial sliding movement at the right end of the shaft 23 outwardly of the recessed wall 17.

The angular positions of the spring winder assembly 27 and the pawl-carrying assembly 26 are coupled to each other by keys 24a in the keyway 24 of the shaft 23.

The winding reel 25 has a plurality of drum-like wind-receiving means, conveniently four, each of a different perimeter, the perimeters being scaledly proportioned to each other. Measured to one of the scales commonly used on construction blue prints, each perimeter equals an even decimal number of length units. For example, the perimetral length of the largest drum may be 10"; drawing out 10" of the winding cord, hereinafter described, will rotate the shaft 23 one full revolution and register a decimal quantity on the counter. This drum is therefore suited for measuring material shown on blue prints drawn to the scale of one inch equals one foot. Proportionately smaller drums would be used to measure prints drawn to smaller scales; thus the next sized drum may have a 5" perimeter and be used to measure drawings to the scale of one-half inch equals one foot.

Such wind-receiving means on the reel 25 are concentric drum-like members 31, 32, 33, 34. Flange-like protective separators 35 are provided between the adjacent drum-like members 34 and at the left side of the largest member 31. Each of the drum-like members 31–34 has an annularly aligned notch 36; and the separators 35 have radial slots 37 in the same angular line. At the right edge of the smallest of the drum-like members 34 is a scale change disc 38 including a slot 39 in the same angular alignment, which does not, however, extend to the periphery of the disc 38.

Figure 3:
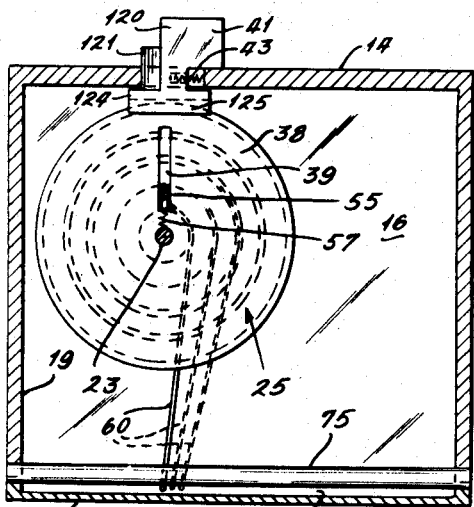
FIGURE 3 is a lateral section taken along line 3—3 of FIGURE 2.
Figure 4:
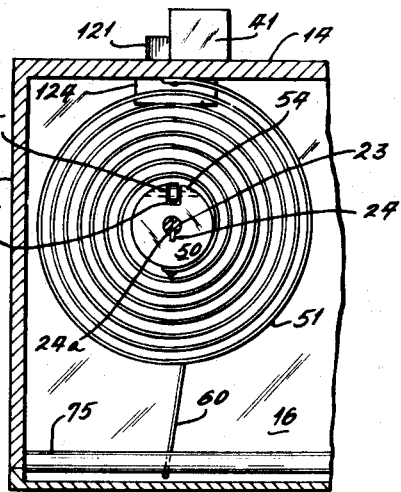
FIGURE 4 is a lateral section taken along line 4—4 of FIGURE 2.

Subject to the torsional restraint of the spring winder assembly 27, the reel 25 is free to turn on the shaft 23. A drive positioner yoke 41, in a serrated positioner opening 42 in the top wall 14, shifts the reel 25 on the shaft 23 to one of four selectable axial positions. A compression spring 43, shown in FIGURE 3, retains the drive positioner yoke 41 in any one of the four serrations 44, 45, 46, 47, which correspond in spacing with the axial spacings between the drums 31–34 of the winding reel 25.

The torsion spring winder assembly 27 includes a winder wheel 50, keyed onto the shaft 23, subject to the torsional reaction of a spiral clock spring 51. The spring 51 has its innermost end secured by a pin to the wheel 50 and its outermost end secured to the case top wall 14 by a rivet 52. A radial notch 53 in the perimeter of the winder wheel 50 is equipped with a tangential pivot pin 54, mounting a winder arm 55 which extends from the winder wheel 50 through the slot 39 of the disc 38, to terminate in a cord-attachment end projection 56, sufficiently small to pass through the separator slots 37 and be received within any one of the drum notches 36. A short tension spring 57 mounted on the shaft 23 and extending to the arm 55 biases the arm about the pivot 54 radially toward the shaft axis.

A winding cord 60 (which may be of wire or other readily wound material) has its inner end 61 secured to the cord-attachment end projection 56. It is particularly to be noted that the winding cord 60 is not itself secured to the winding reel 25.

The pawl-carrying assembly 26 consists of a pawl-carrying wheel 64 keyed for axially-inward sliding movement on the shaft 23. Offset from center is a pawl 67 which may be either a resilient plastic member, mounted angularly to engage in the positive sense of rotation and flex disengagingly on reverse rotation, like an overrunning clutch; but if preferred, a pivot-mounted spring urged pawl may be used, the details of pawl construction being familiar. The pawl 67 is spring urged toward a collar 65 at the right end of the shaft 23, by a volute spring 66 to engage one of the several ratchet wheels of the counter turret 12, hereinafter described. To effect disengagement, a pawl disengagement flange 68 of much greater diameter than the pawl wheel 64, is secured to its inner or left side. Moving the disengagement flange 68 axially to the left, by means of a disengagement manipulation yoke 69, disengages the converter element 11 operationally from the counter turret 12. A small compression spring 70 holds the manipulation yoke 69 in an opening 73 in the case top wall 14, in one of two serrated detent positions 71, 72, the right-hand position being for pawl engagement and the left-hand position being for pawl disengagement.

A guide rod 75 spaced closely above the bottom wall 15 extends from the front wall 19 to the rear wall 20. The guide rod 75 is positioned almost directly beneath the cord-attachment end projection 56 of the arm 55. The bottom wall is provided with a recess 76 which accommodates the cord 60 as it passes to the left of and beneath the guide rod 75 and extends thence to the right.

The bottom wall 15 has an extension portion 77 which extends to the right, and has forward and aft edges 78, 79 grooved inwardly to receive the case of the counter turret 12, hereinafter described. However, near the front edge of the bottom extension 77 a hollow cord guide 80 is provided, through which the cord 60 extends. The right end 81 of the cord guide, which projects beyond the case of the turret counter 12, serves as an index or initial measuring position; it extends at 90° to the direction along which the cord 60 is extendable. Preferably it is slightly recessed, as shown, to receive the edge of a small ring 82 into which the tip of a marking pencil 83 may be inserted.

The counter turret assembly generally designated 12 is best shown in FIGURES 1 and 2. In the embodiment shown, it has a bottomless case, generally designated 85, including a right side wall 86, a left side wall 87 having a circular opening through which the pawl-carrying wheel 64 extends, a top wall 88, rear wall 89, vertical lower front wall portion 90 and sloping upper front wall portion 91. The sloping portion 91 has a counter window 92; also an access opening 93 to the rachet wheel of the counter indexed into operating position inwardly adjacent to the window 92.

Flanges 94 at the bottom edges of the walls 89, 90 are received within the inwardly grooved forward and aft edges 78, 79, so that the case 85 containing an entire counter turret 12 may be removed and replaced with a second turret, if additional registers are needed. The turret 12 has a horizontal turret shaft 95 mounted for rotation in aligned bores 96 in the right and left walls 86, 87. Inner and outer counter mounting discs 97a, 97b are securely affixed to the shaft 95, spaced apart by a tubular spacer 98 and held in such spacing by an inner collar 99 at the left side of the left counter mounting disc, and at the right side by a washer 100, the right side wall 86 itself, and a counter selecting knob 101. A pointer index 102 on the knob 101 cooperates with angularly spaced markers 103 on the side wall 86 to indicate which register is being utilized. The markers 103 may carry identifying indications for each type of material being measured.

The peripheral edge of the inner mounting disc 97a has a plurality of detent notches 104, spaced at angular intervals, engaged selectively by a spring-urged detent pin 105 which projects downwardly through the top wall 88. A small detent control knob 106 is mounted onto the outer end of the spring-urged pin 105 above the top wall 88. Raising the knob 106 lifts the lower end of the pin 105 from engagement in a detent notch 104, to permit the turning of the counter selector knob 101 to change registers.

Figure 5:
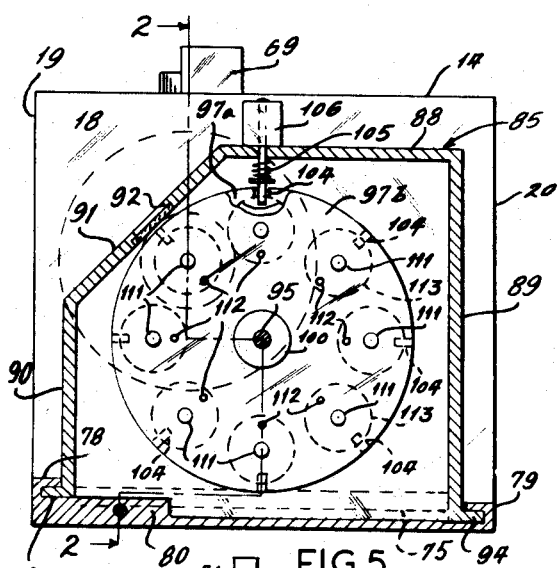
FIGURE 5 is a lateral section taken along line 5—5 of FIGURE 2.
Figure 6:
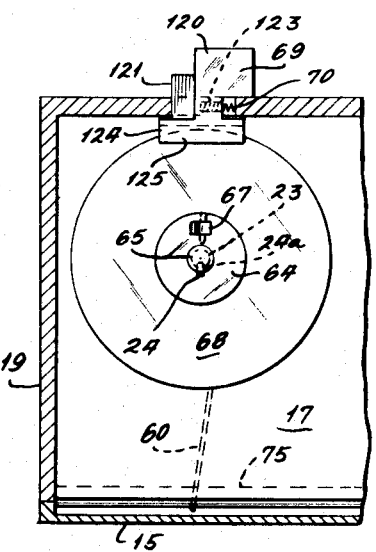
FIGURE 6 is a lateral section taken along line 6—6 of FIGURE 2.
Figure 7:
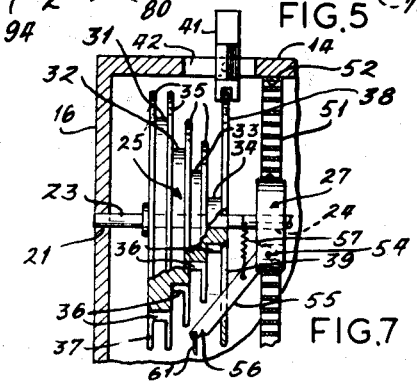
FIGURE 7 is a fragmentary sectional view of the elements at the left side of FIGURE 2, shown in position for changing scale of the instrument.

As shown in FIGURES 1 and 2, the turret shaft 95 is spaced both downward and aft of the converter shaft 23. The amount of this spacing represents the radial length at which a plurality of rotational operated registering counters 110 are mounted on the mounting flanges 97a, 97b. At this radial spacing, the flanges 97a, 97b have aligned bores, referred to as rotation permitting bores 111. The right mounting flange also has a circle of affixment bores 112, shown in FIGURE 5.

The counters 110 are each of the type having a plurality of decimal registers 113. A rotatable input or operating shaft 114 projects from the ends of each register 113, the shafts 114 being mounted for free rotation and extending through the bores 111 in the flanges 97a, 97b. At its right end each counter 110 has a pinion wheel shaft retainer 115 mounted in its affixment bore 112.

At the left end of each operating shaft 114 is mounted a rachet wheel 116. As a particular register is indexed into operating position and aligned with the shaft 23 of the converter element 11, its rachet wheel 116 becomes engageable by the pawl 67. Therefore, whenever the user changes his selection of registers, the pawl-carrying wheel 64 is to be moved inward by the manipulation yoke 69. When a register is indexed to operable position, the perimetral surface of its rachet wheel 116 becomes accessible through the access opening 93 in the sloping wall 91, for manipulation to reset counters, etc.

Figure 8:
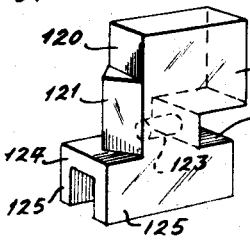
FIGURE 8 is an enlarged perspective view of a yoke-like manipulative element utilized.

The drive positioner yoke 41 and the disengagement manipulation yoke 69 are constructed alike, both being as shown in the perspective view FIGURE 8. Each has an upper manipulative portion 120 by which it is grasped; a projecting tooth portion 121 therebeneath, to engage in one of the serrations 44–47, 71, 72 of the top wall 14; a horizontal notch 122 aft of the tooth portion 121, to engage and slide along the top wall 14 at the aft side of an opening 42, 73; a spring-holding well 123 projecting forwardly and toward the tooth portion 121 from the inner edge of the horizontal notch 122, of sufficient depth to receive a spring 43, 70 when compressed. Beneath the top wall 14, each of the yokes 41, 69 has a downwardly presented channel-like yoke element 124 including parallel flange portions 125 for slidingly receiving the peripheral edges of the scale change disc 38 and disengagement flange 68 respectively.

To operate the converter element 11, the user must first select which one of the drum-like members 31–34 on which the cord 60 is to be wound. To change selection, the user must first unwind the cord 60 from the drum on which it is then wound. To do this he first disengages the register of that counter 113 in alignment with the shaft 23, by means of the disengagement manipulation yoke 69, moving the pawl disengagement disc 68 to the left. In this position, rotations of the shaft 23 accompanying unwinding the cord will not be registered. With the disengagement manipulation yoke 69 moved to the left serration 72, the cord 60 is drawn out its entire length, so that when it reaches its extreme position, it will have so rotated the reel 25 that its slots 37 extend downwardly, as does the slot 39 in the scale change disc 38. Tension on the cord 60 draws the winder arm 55 downward as far as the slot 39 will permit. In this position, the cord 60 is completely disengaged from any of the drum-like members 31–34. Inasmuch as the arm 55 has rotated with each rotation of the reel 25, this extreme extended position of the cord 60 also coincides with the fully wound position of the spring 51.

The user then moves the drive positioner manipulation yoke 41 to shift the reel 25, so that the selected drum 31–34 comes into axial registration with the cord-attachment end projection 56.

Relaxing tension on the cord 60 first seats the cord-attachment end projection 56 in the notch 36 of the drum-like member 31–34, so selected. The fully wound torsion spring, acting through the arm 55, then winds the cord 60 upon the drum-like member 31–34 so selected, until the ring 82 seats against the right end 81 of the cord guide 80. The disengagement yoke 69 is then returned to the right hand position, re-engaging the pawl 67 with the ratchet wheel 116.

To couple and uncouple a selected registering counter 113 from operable position, the same pawl and ratchet disengagement means is utilized. The amount measured off each time the cord 60 is extended is automatically registered and continuously totalled, on the individual register utilized for each type of material. All material of the same type is totaled on the same register, though it may be shown on drawings made to different scale, by changing the scale of the converter element 11 in the manner herein described.

Modifications in details of construction will be apparent to persons desiring to adapt the instrument to various uses. Accordingly, the present invention should not be construed narrowly, but instead as fully coextensive with the claims hereof.

I claim:

1. A variable drive linear measuring instrument, comprising a rotation-operating registering counter,
   a winding reel rotatable about an axis,
   an extensible cord rewindable upon the reel to an initial measuring position,
   means to extend the cord unwindably from the reel,
   irreversible means to couple the rotation of the reel to the register of the counter on unwinding rotation only, and
   spring-operated means to resist unwinding the reel and to rewind same,
   said instrument being characterized in
   the reel having a plurality of axially adjacent wind-receiving means of different perimeters scaledly proportionate to each other, together with
   means to retain the inner end of the cord in axial registration with a selected wind-receiving means of the reel,
   means to shift such axial registration from one of the wind-receiving means to another, and
   means to disengage the register of the counter
   whereby the cord may be fully extended for purposes of changing selection of wind-receiving means without actuating the counter register.

2. A variable drive linear measuring instrument as defined in claim 1,
   the reel being turned angularly and slidably axially on a shaft by which its angular rotation is delivered to the counter.

3. A variable drive linear measuring instrument as defined in claim 1,
   the said plurality of wind-receiving means consisting of concentric drum-like members of different diameter and flange-like separators therebetween,
   the separators having angularly aligned apertures,
   the spring-operated means including an arm extending longitudinally alongside the axis and received within said apertures for bearing engagement against the aperture sides,
   said arm having a cord-attachment end which comprises the means to retain the inner end of the cord.

4. A variable drive linear measuring instrument as defined in claim 3,
   further characterized in that the separator apertures extend radially, and in that
   the arm has a pivot remote from its cord-attachment end and spaced axially from the wind-receiving means,
   together with means to bias the arm about said pivot radially toward the axis,
   whereby its cord-attachment end may engage the cord against and for winding upon a selected wind-receiving means.

5. A variable drive linear measuring instrument as defined in claim 4,
   said means to couple the rotation of the reel to the register of the counter including in part
   the said arm,
   a member through which said arm extends, radially slotted in angular alignment with the separator apertures, said slotted member being secured to the reel,
   a shaft concentric with the winding reel axis, and
   means keying the said spring-operated means to said shaft.

6. A variable drive linear measuring instrument for separately totalling different materials, comprising
   a plurality of rotational operated registering counters,
   a turret mounting carrying said registering counters at equal radial distances from a turret axis,
   means to index the turret mounting angularly to an operable position,
   means to couple and uncouple a selected registering counter at the operable position,
   a winding reel rotatable about an axis coinciding with the operable position of the turret,
   an extensible cord rewindable upon the reel to an initial measuring position,
   means to extend the cord unwindably from the reel,
   irreversible means to couple the rotation of the reel to the register of the counter on unwinding rotation only,
   spring-operated means to resist unwinding the reel and to rewind same, the reel having a plurality of axial adjacent wind-receiving means of different perimeters scaled proportionate to each other, means to retain the inner end of the cord in axial registration with a selected wind-receiving means of the reel, and means to shift such axial registration from one of the wind-receiving means to another.

No references cited.

ISAAC LISANN, *Primary Examiner.*